United States Patent
Wu et al.

(10) Patent No.: US 11,546,451 B2
(45) Date of Patent: Jan. 3, 2023

(54) ELECTRONIC DEVICE

(71) Applicant: ASUSTeK COMPUTER INC., Taipei (TW)

(72) Inventors: I-Hsi Wu, Taipei (TW); Jen-Pang Hsu, Taipei (TW); Ching-Hsuan Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 301 days.

(21) Appl. No.: 15/930,476

(22) Filed: May 13, 2020

(65) Prior Publication Data

US 2020/0366772 A1 Nov. 19, 2020

Related U.S. Application Data

(60) Provisional application No. 62/848,074, filed on May 15, 2019.

(30) Foreign Application Priority Data

Jan. 8, 2020 (TW) .................. 109100653

(51) Int. Cl.
*H04M 1/02* (2006.01)
*H04N 5/232* (2006.01)

(52) U.S. Cl.
CPC ....... *H04M 1/0264* (2013.01); *H04M 1/0266* (2013.01); *H04M 2250/20* (2013.01); *H04N 5/23219* (2013.01)

(58) Field of Classification Search
None
See application file for complete search history.

(56) References Cited

U.S. PATENT DOCUMENTS

| | | | |
|---|---|---|---|
| 6,933,981 B1 | 8/2005 | Kishida et al. | |
| 7,627,342 B2 | 12/2009 | Kang | |
| 7,672,118 B2 | 3/2010 | Yamazato et al. | |
| 7,782,375 B2 | 8/2010 | Chambers et al. | |
| 3,010,154 A1 | 8/2011 | Chambers et al. | |
| 10,291,847 B2 | 5/2019 | Chin et al. | |
| 10,915,163 B2 | 2/2021 | Tzou et al. | |

(Continued)

FOREIGN PATENT DOCUMENTS

| | | |
|---|---|---|
| CN | 1633136 A | 6/2005 |
| CN | 1979322 A | 6/2007 |

(Continued)

*Primary Examiner* — Quoc D Tran
(74) *Attorney, Agent, or Firm* — McClure, Qualey & Rodack, LLP

(57) ABSTRACT

An electronic device is provided the disclosure. The electronic device includes: a body; an image capture device, rotatably disposed on the body to capture an image of an object; a display, configured at a first side of the body and including a display zone, the display zone is configured to display the image of the object; a motor set, electronically connected with the image capture device; and a processor, electronically connected with the image capture device, the display, and the motor set and configured to control the motor set, wherein the display zone includes a center part, when at least part of the object displayed at the display zone is not in the center part, the processor controls the motor set to drive the image capture device to track the object.

11 Claims, 7 Drawing Sheets

(56) References Cited

U.S. PATENT DOCUMENTS

| | | |
|---|---|---|
| 11,196,848 B2 * | 12/2021 | Zeng .................... H04N 5/2257 |
| 11,258,934 B2 * | 2/2022 | Jia ........................ H04N 5/2252 |
| 2003/0220145 A1 | 11/2003 | Erickson et al. |
| 2005/0024500 A1 | 2/2005 | Katayama |
| 2005/0110874 A1 | 5/2005 | Song |
| 2005/0270385 A1 | 12/2005 | Shioya et al. |
| 2007/0132835 A1 | 6/2007 | Kang |
| 2012/0268608 A1 * | 10/2012 | Watanabe .......... H04N 5/23219 348/169 |
| 2014/0320604 A1 | 10/2014 | Dalvi et al. |
| 2014/0354779 A1 | 12/2014 | Cho et al. |
| 2015/0005031 A1 * | 1/2015 | Sheu .................... H04N 5/2257 348/371 |
| 2015/0189175 A1 | 7/2015 | Fan et al. |
| 2015/0370226 A1 | 12/2015 | Kim et al. |
| 2016/0148384 A1 * | 5/2016 | Bud .................... H04N 5/23229 348/207.11 |
| 2017/0163879 A1 * | 6/2017 | Tsuji .................. H04N 5/23287 |
| 2018/0069983 A1 * | 3/2018 | Cho .................... G06F 3/04886 |
| 2019/0050664 A1 * | 2/2019 | Yang .................... G06T 19/006 |
| 2020/0366774 A1 * | 11/2020 | Jia .............................. G06F 1/16 |
| 2022/0006886 A1 * | 1/2022 | Huang ................ H04N 5/2252 |

FOREIGN PATENT DOCUMENTS

| | | |
|---|---|---|
| CN | 101634871 A | 1/2010 |
| CN | 102170493 A | 8/2011 |
| CN | 102572031 B | 12/2014 |
| CN | 104255015 A | 12/2014 |
| CN | 104469165 A | 3/2015 |
| CN | 204425471 U | 6/2015 |
| CN | 104954675 A | 9/2015 |
| CN | 105827847 A | 8/2016 |
| CN | 105955779 A | 9/2016 |
| CN | 107333055 A | 11/2017 |
| CN | 107509038 A | 12/2017 |
| CN | 107671862 A | 2/2018 |
| CN | 104954676 B | 3/2018 |
| CN | 107819907 A | 3/2018 |
| CN | 107872582 A | 4/2018 |
| CN | 207530941 U | 6/2018 |
| CN | 104301609 B | 9/2018 |
| CN | 108495039 A | 9/2018 |
| CN | 108509782 A | 9/2018 |
| CN | 108566510 A | 9/2018 |
| CN | 108683795 A | 10/2018 |
| CN | 108989660 A | 12/2018 |
| CN | 109167894 A | 1/2019 |
| CN | 109388925 A | 2/2019 |
| CN | 103873652 B | 3/2019 |
| CN | 109639965 A | 4/2019 |
| TW | M417729 U1 | 12/2011 |
| TW | M436853 U1 | 9/2012 |
| TW | 201631954 A | 9/2016 |
| TW | 201702808 A | 1/2017 |

* cited by examiner

ELECTRONIC DEVICE

CROSS-REFERENCE TO RELATED APPLICATION

This application claims the priority benefits of U.S. provisional application Ser. No. 62/848,074 filed on May 15, 2019 and Taiwan application serial No. 109100653, filed on Jan. 8, 2020. The entirety of the above-mentioned patent applications are hereby incorporated by references herein and made a part of specification.

BACKGROUND OF THE INVENTION

Field of the Invention

The invention relates to an electronic device and, more particular, to an electronic device with a camera module.

Description of the Related Art

When an electronic device with a camera module is in a fixed location and is used to capture images while an object or a scene is moving, the captured images are usually dynamic blurred or out of focus.

On the contrary, when the electronic device moves along with the moving object or the moving scene, the captured pictures are also dynamic blurred or out of focus. Such images are not so satisfied by users.

BRIEF SUMMARY OF THE INVENTION

An electronic device provided here controls an image capture device to track a moving object to be captured via a motor set, and keeps the object in a center part of a display zone to achieve auto-focusing feature.

According to an aspect of the disclosure, an electronic device is provided. The electronic device comprises: a body; an image capture device, rotatably disposed on the body to capture an image of an object; a display, configured at a first side of the body and including a display zone, the display zone is configured to display the image of the object; a motor set, electronically connected with the image capture device; and a processor, electronically connected with the image capture device, the display, and the motor set and configured to control the motor set, wherein the display zone includes a center part, when at least part of the object displayed at the display zone is not in the center part, the processor controls the motor set to drive the image capture device to track the object.

In sum, an electronic device controls an image capture device to track an object via a motor set, and then an image of the object is kept in a center part of a display zone.

BRIEF DESCRIPTION OF THE DRAWINGS

These and other features, aspects and advantages of the present invention will become better understood with regard to the following description, appended claims, and accompanying drawings.

DETAILED DESCRIPTION OF THE EMBODIMENTS

The terms "including", "having", etc used in this disclosure are all open terms, meaning "including but not limited to." In addition, "and/or" as used in this disclosure includes any one or more of the items listed in the relevant list and all combinations thereof.

In this article, when an element is called "connected" or "coupled", it can mean "electrically connected" or "electrically coupled". "Connected" or "coupled" can also be configured to indicate that two or more components operate together or interact with each other. In addition, although the terms "first", "second", . . . are used herein to describe different elements, the above terms are only configured to distinguish elements or operations described in the same technical term. Unless the context clearly indicates, the above terms are not specifically referred to or implied in order, nor are they configured to limit the invention.

Figure 1A:
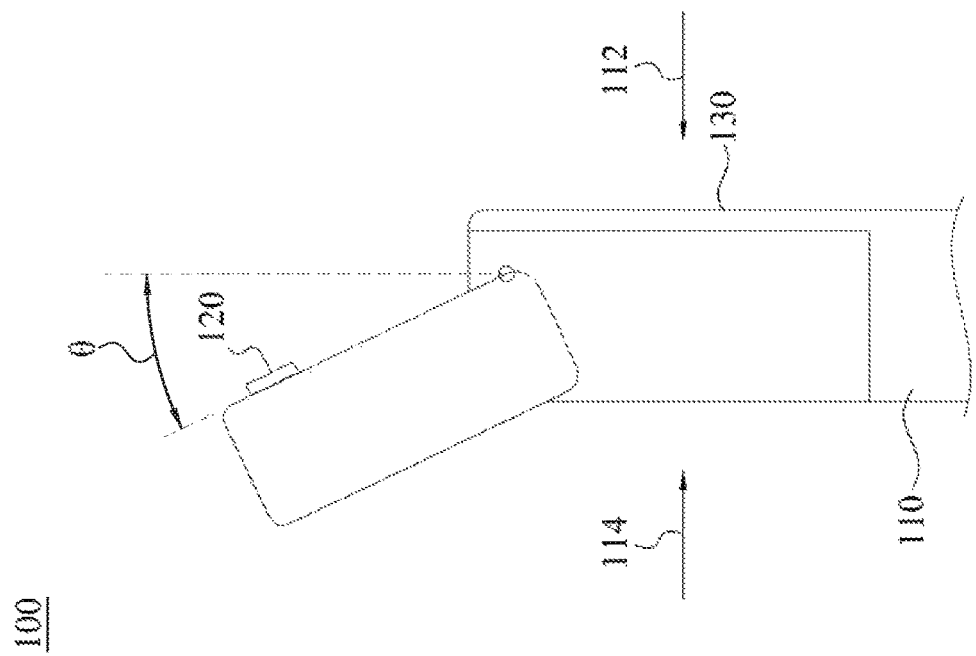
FIG. 1A is a schematic diagram showing an electronic device according to an embodiment of the disclosure.
Figure 1B:
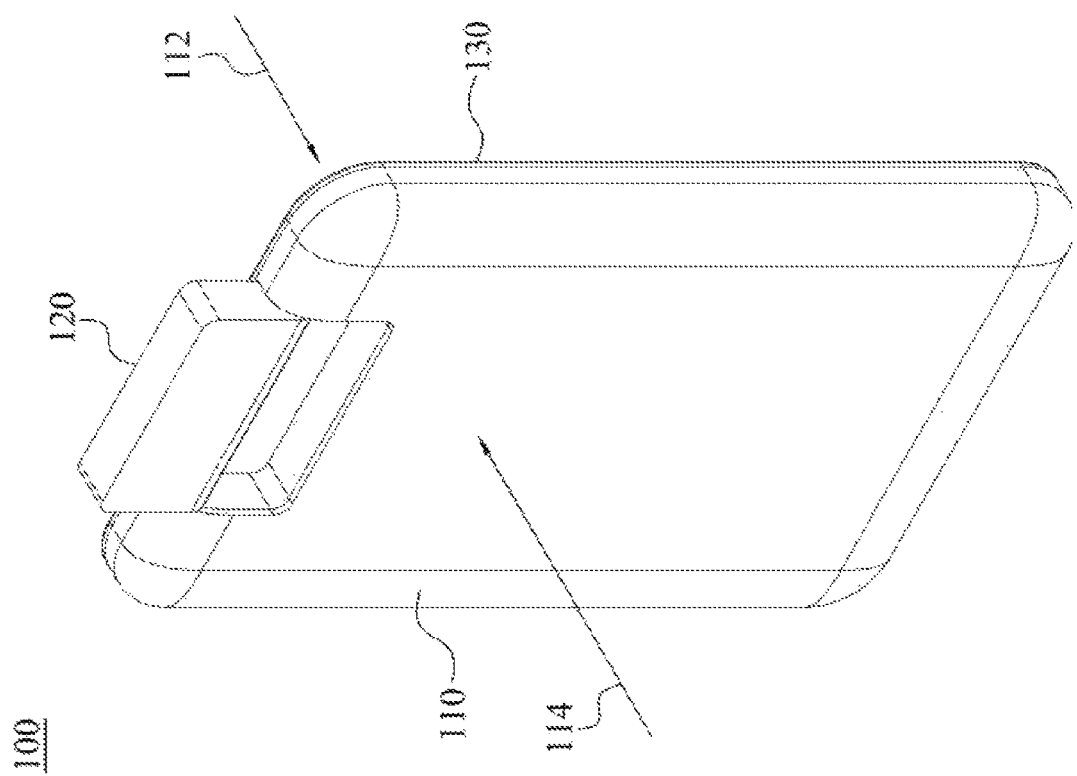
FIG. 1B is a schematic diagram showing an electronic device according to an embodiment of the disclosure.
Figure 2:
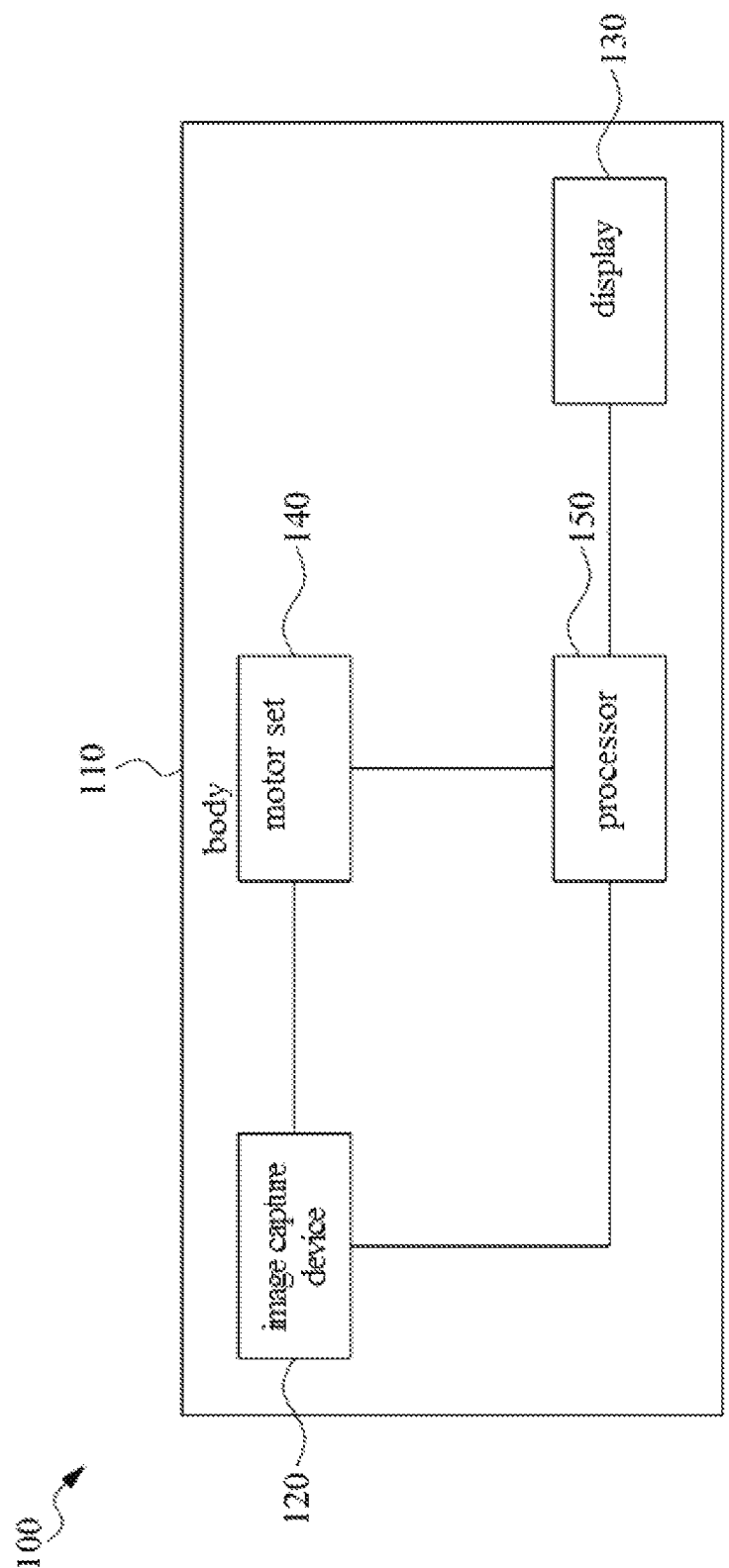
FIG. 2 is a function block showing an electronic device according to an embodiment of the disclosure.

Please refer to FIG. 1A, FIG. 1B and FIG. 2, an electronic device 100 includes a body 110, an image capture device 120, a display 130, a motor set 140, and a processor 150. The processor 150 is electronically connected with the image capture device 120, the display 130, and the motor set 140. The body 110 includes a first side 112 and a second side 114 opposite to each other. The image capture device 120 is rotatably disposed on the body 110 to capture images of objects. The display 130 is disposed on the first side 112 of the body 110 and includes a display zone. In an embodiment, the display zone displays images of objects captured from the image capture device 120. The motor set 140 is electronically connected with the image capture device 120 to drive the image capture device 120 to rotate by an angle θ. In an embodiment, the processor 150 controls the motor set 140.

In an embodiment, the electronic device 100 is a smart phone. The image capture device 120 is a camera lens disposed on the smart phone. The display 130 is a screen at the front of the body 110. In embodiments, the screen is LCD, LED, OLED, AMOLED, or IPS, which is not limited herein. In an embodiment, the motor set 140 is a U-shape motor. The processor 150 is a Central Processing Unit (CPU), a microprocessor, or other components with a data processing function.

In an embodiment, the motor set 140 is electronically connected with the image capture device 120. The motor set 140 drives the image capture device 120 to track the object and keeps the object be displayed on a center part of the display zone. The processor 150 is electronically connected with the image capture device 120, the display 130, and the motor set 140. The processor controls the motor set 140. The processor 150 determines the size of a center part according to the proportion of the size of the object displayed on the display zone to that of the display zone. In an embodiment, the size of the center part is a first size or a second size. The second size is larger than the first size. In an embodiment, when the motor set 140 drives the image capture device 120 to rotate by the angle θ, the image capture device 120 is at a front lens position, a rear lens position, or a position between the front lens position and the rear lens position. In an embodiment, when the image capture device 120 is at the rear lens position, the image capture device 120 is at the second side 114 of the body 110. When the image capture device 120 rotates relative to the body 110 by the angle of 180°, the image capture device 120 is at the front lens position, and the image capture device 120 and the display 130 face a same direction. In an embodiment, the processor 150 of the electronic device 100 controls the motor set 140 to rotate the image capture device 120 by 0° to 180° to track the object according to requirements. Then, the displayed object is kept in the center part of the display zone. The way of keeping the object to be displayed in the center part of the display zone is illustrated hereinafter.

Figure 3:
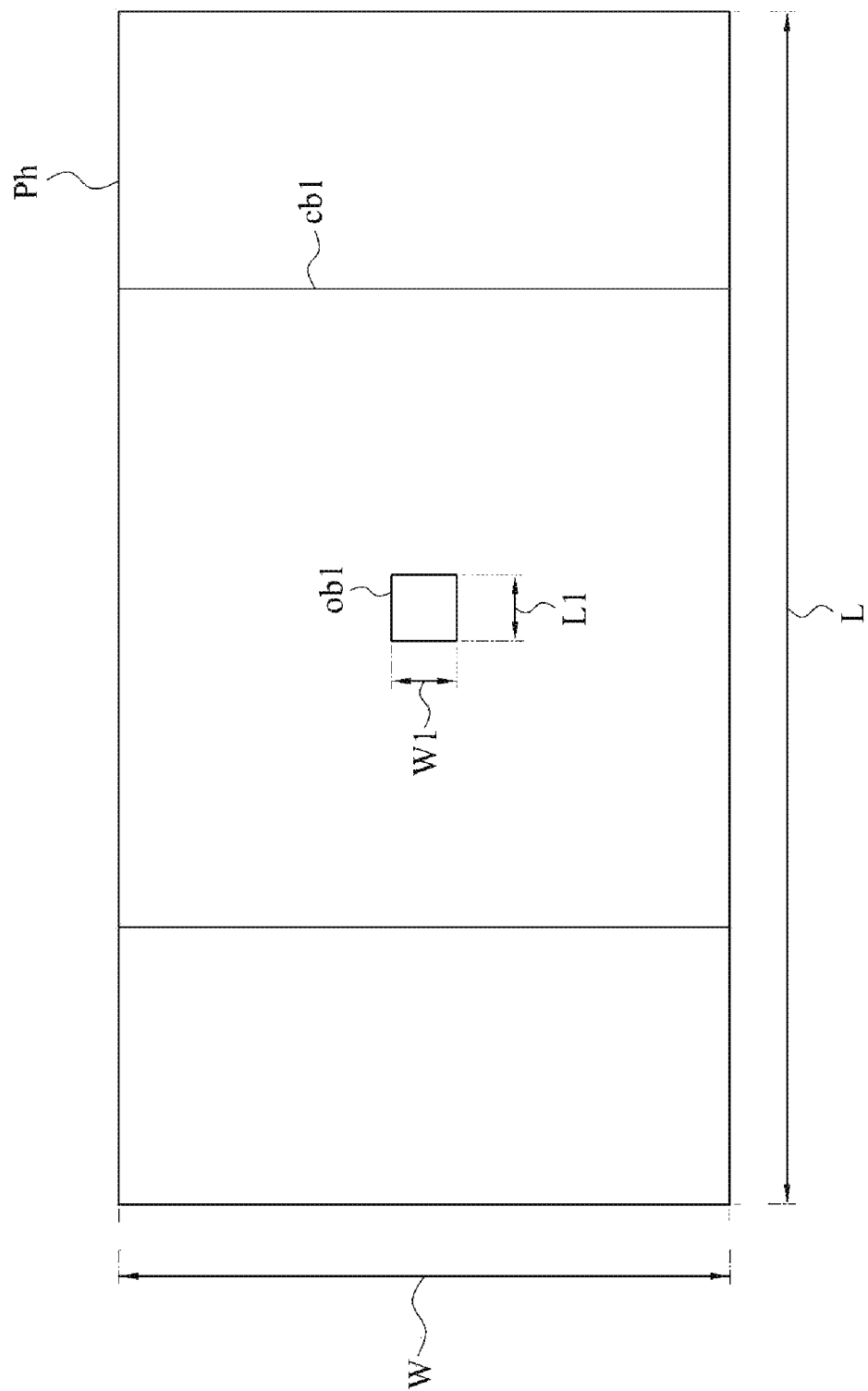
FIG. 3 is a schematic diagram showing operation of an electronic device according to an embodiment of the disclosure.

In FIG. 3, in an embodiment, when a camera function of the electronic device 100 is enabled, the image capture device 120 is activated. A display zone Ph of the display 130 displays an image captured from the image capture device 120 for users. The display zone Ph is a picture of the length L and the width W. The object ob1 displayed at the image in the display zone Ph is a target objected to be captured. The object ob1 is displayed at the display zone Ph with the length L1 and the width W1.

In an embodiment, the processor 150 presets the first size of the center part cb1 as the first proportion of the length L of the display zone Ph (for example, the first size is 0.5 times of the length L of the display zone P). The width of the center part cb1 is equal to the width W of the display zone Ph. In an embodiment, the second size of the center part cb1 is the second proportion of the length L of the display zone Ph (for example, the second size is 0.6 times of the length L of the display zone Ph). The width of the center part cb1 is equal to the width W of the display zone Ph. The second proportion is larger than the first proportion.

The processor 150 compares product generated by multiplying the size of the object ob1 displayed on the display zone Ph by a multiplying factor by with the first size or the second size of the center part cb1 to select the first size or the second size as the size of the center part cb1. In an embodiment, when the product of the object ob1 is smaller than or equal to the first size of the center part cb1 (for example, the product generated by multiplying the length of the object ob1 displayed on the display zone Ph by the multiplying factor is smaller than the first proportion of the length L of the display zone Ph), the processor 150 selects the first size as the size of the center part cb1.

Please refer to FIG. 3, in an embodiment, the multiplying factor is 5, the length L of the display zone Ph is 24 cm, and the length L1 of the object displayed on the display zone Ph ob1 is 2 cm. 0.5 times of the length L of the display zone Ph (that is, the first size of the center part cb1) is 12 cm. the length L1 of the object ob1 (that is, the product of the object ob1) multiplied by 5 is 10 cm. The processor 150 compares the product of the object ob1 (10 cm) with the first size of the center part cb1 (12 cm) to determine that the product of the object ob1 is smaller than the first size of the center part cb1 (that is, 10 cm is smaller than 12 cm), and then the processor 150 selects the first size as the size of the center part cb1.

Figure 4:
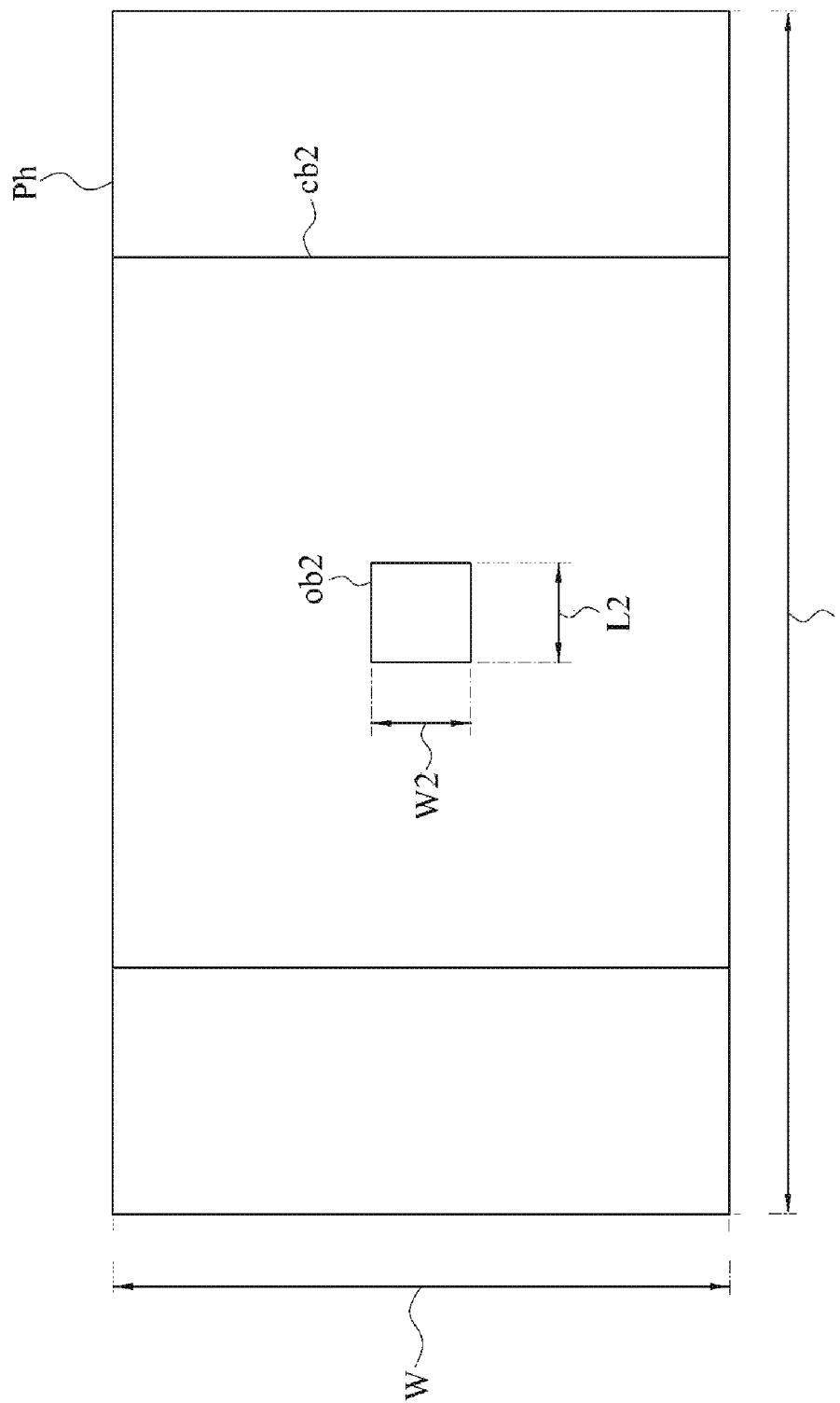
FIG. 4 is a schematic diagram showing operation of an electronic device according to an embodiment of the disclosure.

Please refer to FIG. 4, In an embodiment, when the processor 150 determines that the product of the object displayed on the display zone Ph ob2 is larger than the first size of the center part cb2 but smaller than or equal to the second size of the center part cb2 (for example, the product generated by multiplying the length of the object ob2 displayed on the display zone Ph by the multiplying factor is larger than the first proportion of the length L of the display zone Ph and smaller than or equal to the second proportion of the length L of the display zone Ph), the processor 150 selects the second size as the size of the center part cb2.

In an embodiment, when the user wants to capture the object ob2, the multiplying factor is 5, the length L of the display zone Ph is 24 cm, and the length L2 of the object ob2 displayed at the display zone Ph ob2 is 2.5 cm. 0.5 times of the length L of the display zone Ph (that is the first size of the center part cb2) is 12 cm. 0.6 times of the length L of the display zone Ph (that is the second size of the center part cb2) is 14.4 cm. 5 times of the length L2 of the object ob2 (that is the product of the object ob2) displayed on the display zone Ph multiplied by 5 is 12.5 cm. The processor 150 determines the product of the object ob2 (12.5 cm) is larger than the first size of the center part cb2 (12 cm) and smaller than the second size of the center part cb2 (14.4 cm), and then the processor 150 selects the second size as the size of the center part cb2.

Figure 5:
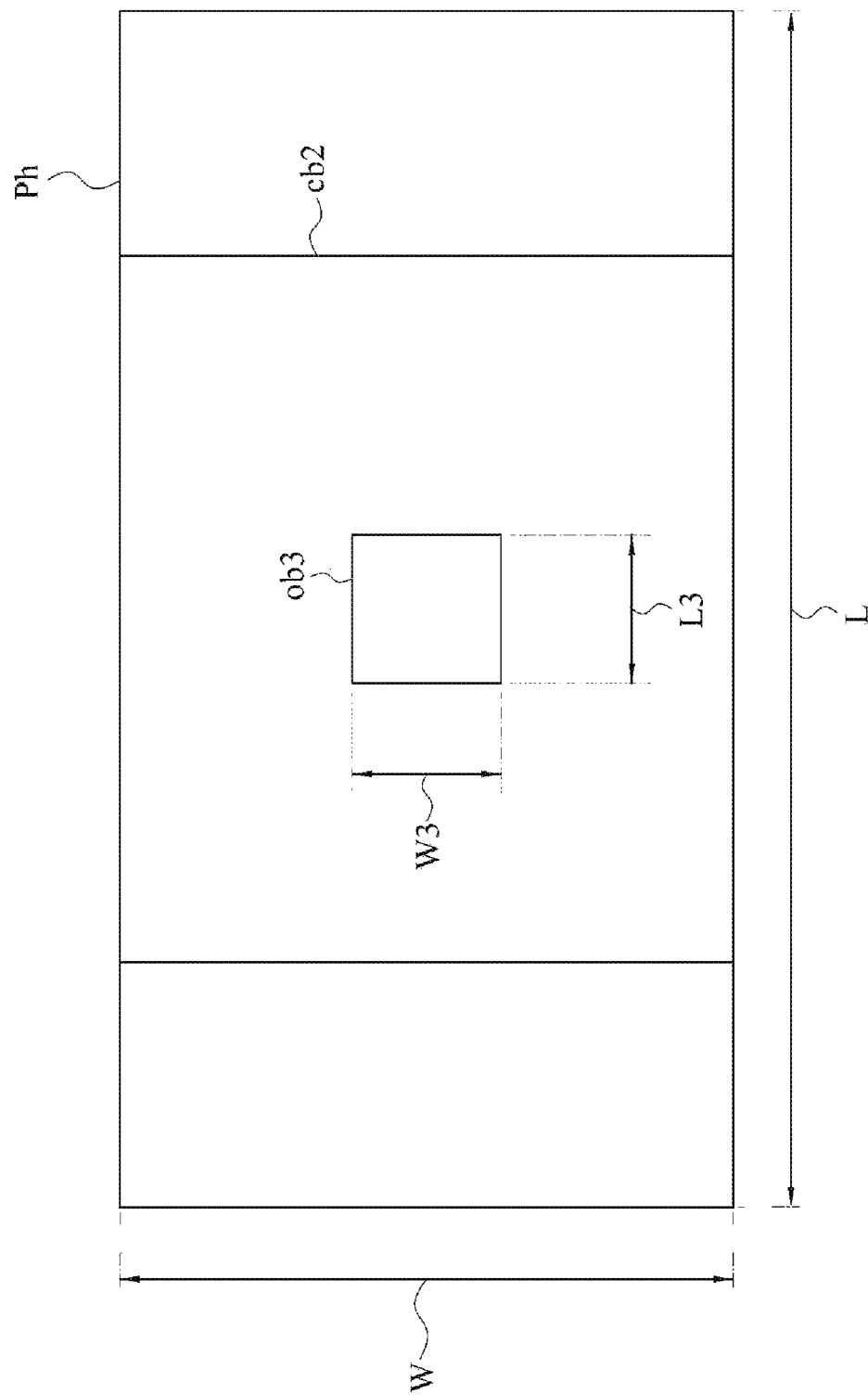
FIG. 5 is a schematic diagram showing operation of an electronic device according to an embodiment of the disclosure.

Please refer to FIG. 5, in an embodiment, when the processor 150 determines the product of the object ob3 displayed at the display zone Ph is larger than the second size of the center part cb2 (for example, the product generated by multiplying the length of the object ob3 displayed on the display zone Ph by the multiplying factor is larger than the second proportion of the length L of the display zone Ph), the processor 150 selects the second size as the size of the center part cb3.

In an embodiment, when the user wants to capture the object ob3, the multiplying factor is 5, the length L of the display zone Ph is 24 cm, and the length L3 of the object ob3 displayed at the display zone Ph is 3 cm. 0.6 times of the length L of the display zone Ph (that is the second size of the center part cb2) is 14.4 cm. 5 times of the length L3 of the object ob3 displayed on the display zone Ph (that is the product of the object ob3) multiplied by 5 is 15 cm. The processor 150 determines the product (15 cm) of the object displayed on the display zone Ph ob3 is larger than the second size of the center part cb2 (14.4 cm), and then the processor 150 selects the second size as the size of the center part cb2.

In an embodiment, the object displayed at the display zone Ph includes an object center position. The center part of the display zone Ph includes a block center position. When at least part of the object displayed on the display zone Ph is not in the center part, the processor 150 controls the motor set 140 to drive the image capture device 120 to rotate, and then the distance between the object center position and the block center position is smaller than a multiple size of the object.

Figure 6:
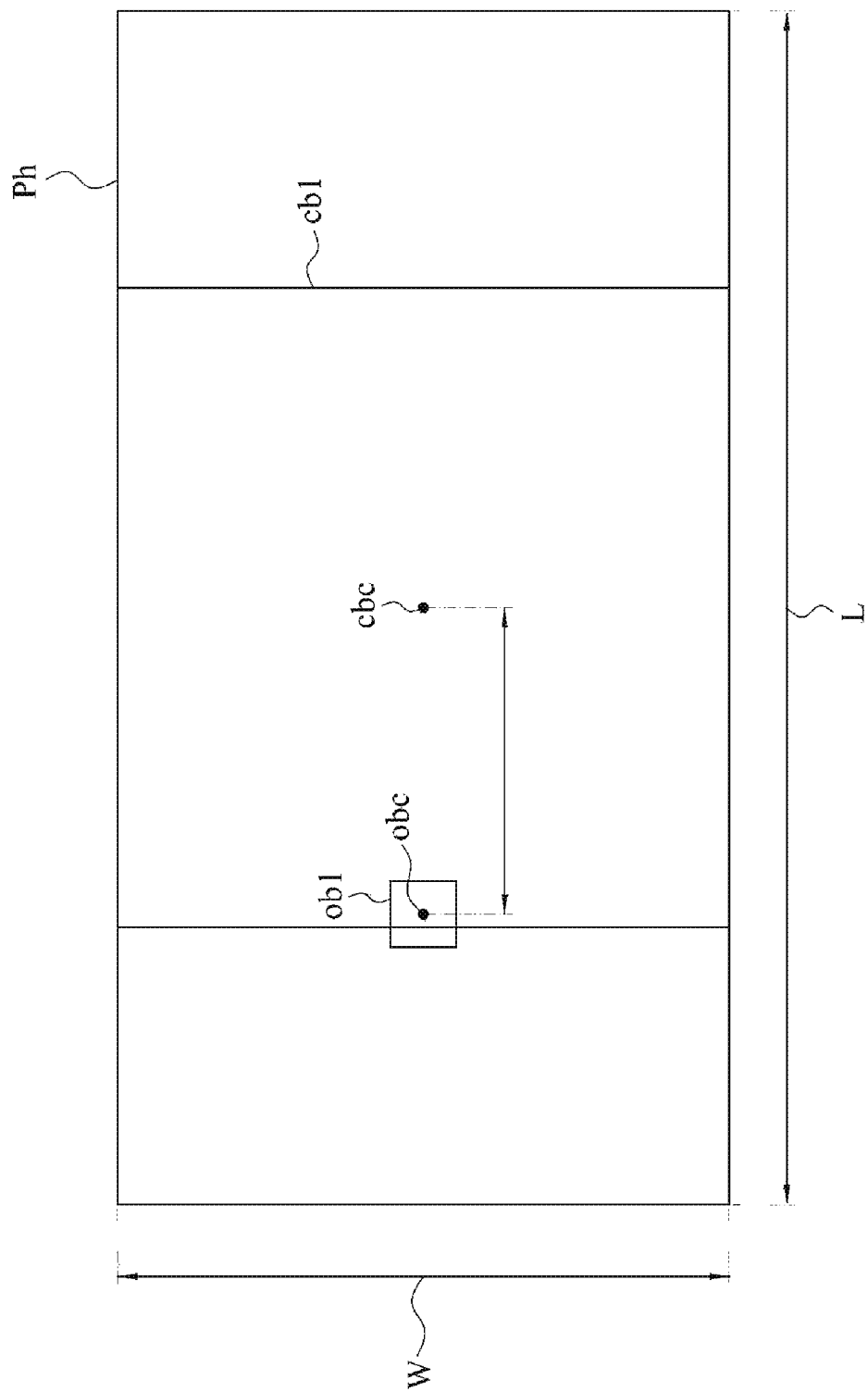
FIG. 6 is a schematic diagram showing operation of an electronic device according to an embodiment of the disclosure.

Please refer to FIG. 6, the object displayed at the display zone Ph ob1 includes an object center position obc, and the center part of the display zone Ph cb1 includes a block center position cbc. In the embodiment, the object center position obc is the center of the object ob1, and the block center position cbc is the center of the center part cb1.

The processor 150 sets the multiple size of the object is that 0.1 times of the size of the object ob1 displayed on the display zone Ph. In an embodiment, the multiple size of the object ob1 is 0.1 times of the length of the object displayed at the display zone Ph (such as 0.2 cm). in an embodiment, the processor 150 determines whether at least part of the object ob1 displayed on the display zone Ph is not in the center part. When at least part of the object ob1 displayed on the display zone Ph is not in the center part, the processor 150 controls the motor set 140 to drive the image capture device 120 to rotate to track the object ob1, to make the distance between the object center position obc of the object ob1 and the block center position cbc smaller than or equal to the multiple size of the object (that is, 0.1 times of the length of the object ob1 displayed on the display zone Ph).

In an embodiment, when the object ob1 to be captured is not in the center part cb1 of the display zone Ph, the processor 150 controls the motor set 140 to drive the image capture device 120 to track the object ob1, and then to make the distance between the object center position obc and the block center position cbc is smaller than the multiple size of the object.

Figure 7:
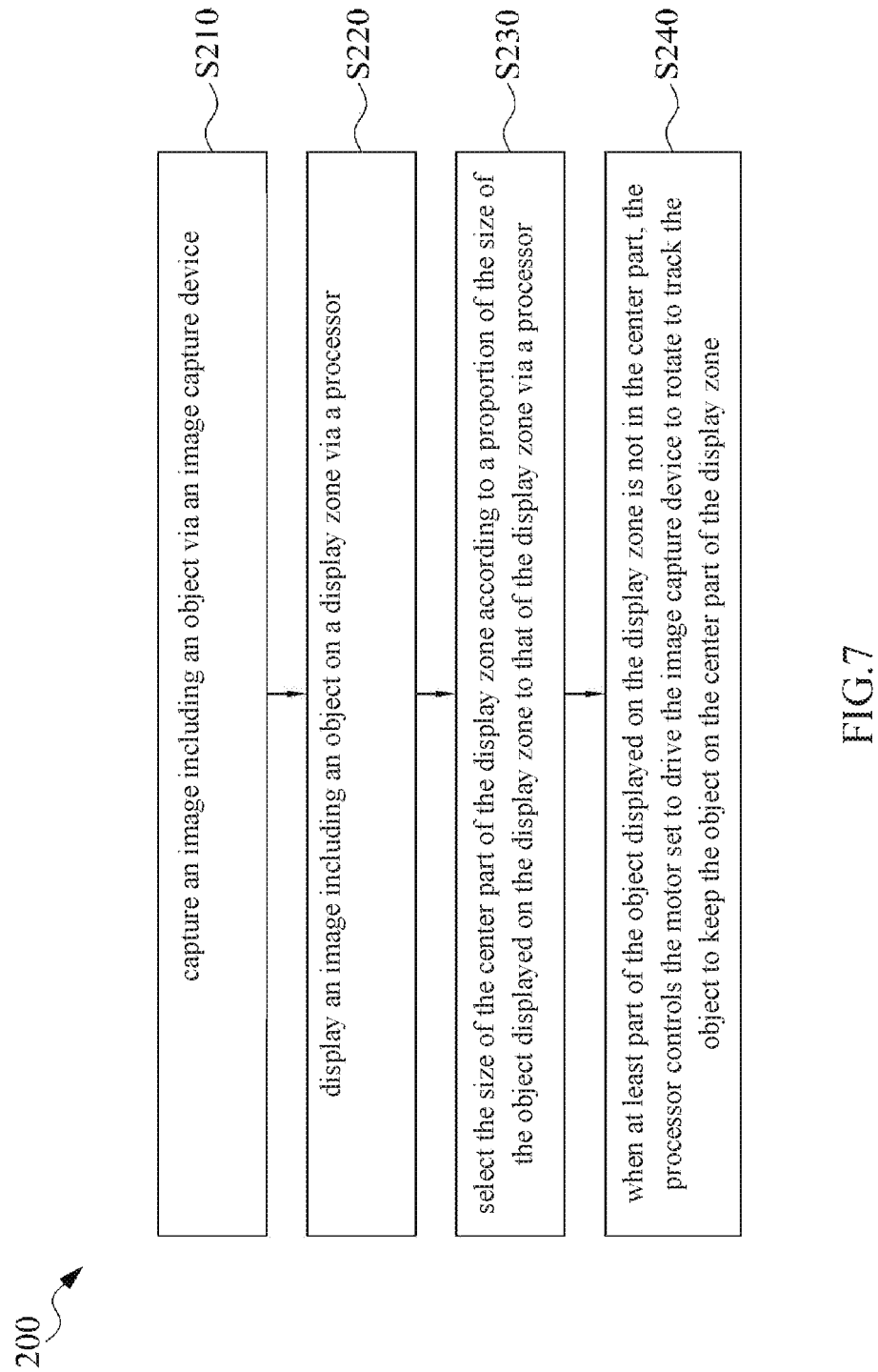
FIG. 7 is a flow chart showing an operation method of an electronic device according to an embodiment of the disclosure.

Please refer to FIG. 7. FIG. 7 is a flow chart 200 showing an operation method of an electronic device according to an embodiment of the disclosure. Please refer to FIG. 2. The operation method 200 includes step S210, step S220, step S230, and step S240. In step S210, the image capture device 120 captures an image including an object ob1, ob2, or ob3. In step S220, the image including the object ob1, ob2, or ob3 is displayed on the display zone Ph of the display 130. In step S230, the processor 150 selects the size of the center part of the display zone Ph according to a proportion of the size of the object displayed on the display zone Ph to that of the display zone Ph. In step S240, when at least part of the object displayed on the display zone Ph is not in the center part, the processor controls the motor set 140 to drive the image capture device 120 to rotate to track the object to keep the object displayed on the center part of the display zone Ph.

In sum, an electronic device controls an image capture device to track an object to be captured via a motor set, and then to make the image of the object keep in a center part of a display zone. As a result, the electronic device has an auto-focusing function. When an object or a scene is in moving, captured pictures would not be blurry or out of focus.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a body;
   an image capture device, rotatably disposed on the body to capture an image of an object;
   a display, configured at a first side of the body and including a display zone, the display zone is configured to display the image of the object;
   a motor set, electronically connected with the image capture device; and
   a processor, electronically connected with the image capture device, the display, and the motor set and configured to control the motor set,
   wherein the display zone includes a center part, when at least part of the object displayed at the display zone is not in the center part, the processor controls the motor set to drive the image capture device to track the object,
   wherein the processor selects a size of the center part according to a proportion of a size of the object displayed at the display zone to a size of the display zone.

2. The electronic device according to claim 1, wherein the size of the center part is a first size or a second size, and the second size is larger than the first size.

3. The electronic device according to claim 2, wherein the first size of the center part is a first proportion of a size of the display zone, the second size of the center part is a second proportion of a size of the display zone, and the second proportion is larger than the first proportion.

4. The electronic device according to claim 2, wherein the processor compares a product generated by multiplying the size of the object displayed on the display zone by a multiplying factor with at least one of the first size or the second size to determine the first size or the second size is to be selected as the size of the center part.

5. The electronic device according to claim 4, wherein when the product of the object is smaller or equal to the first size, the processor selects the first size as the center part.

6. The electronic device according to claim 4, wherein when the product of the object is larger than the first size and smaller or equal to the second size, the processor selects the second size as the size of the center part.

7. The electronic device according to claim 4, wherein when the product of the object is larger than the second size, the processor selects the second size as the size of the center part.

8. The electronic device according to claim 1, wherein the object displayed in the display zone includes an object center position, the center part of the display zone includes a block center position, when at least part of the object displayed on the display zone is not in the center part, the processor controls the motor set to drive the image capture device to rotate to make a distance between the object center position and the block center position smaller or equal to a multiple size of the object.

9. The electronic device according to claim 8, wherein the multiple size of the object is 0.1 of the size of the object displayed on the display zone.

10. The electronic device according to claim 4, wherein the multiplying factor is five.

11. The electronic device according to claim 2, wherein the first size is 0.5 of the size of the display zone, and the second size is 0.6 of the size of the display zone.

* * * * *